United States Patent
Rao (10) Patent No.: US 9,525,657 B2
(45) Date of Patent: *Dec. 20, 2016

(54) SYSTEM FOR AUTOMATIC BLOGGING AND SOCIAL GROUP INTERACTIONS

(71) Applicant: Bindu Rama Rao, Laguna Niguel, CA (US)

(72) Inventor: Bindu Rama Rao, Laguna Niguel, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/884,423

(22) Filed: Oct. 15, 2015

(65) Prior Publication Data

US 2016/0080307 A1    Mar. 17, 2016

Related U.S. Application Data (63) Continuation of application No. 13/430,522, filed on Mar. 26, 2012, now Pat. No. 9,189,774, which is a continuation-in-part of application No. 12/925,417, filed on Oct. 21, 2010, now Pat. No. 8,639,764.

(51) Int. Cl.
| | |
|---|---|
| G06F 15/16 | (2006.01) |
| H04L 12/58 | (2006.01) |
| G06Q 10/10 | (2012.01) |
| H04L 29/06 | (2006.01) |
| H04W 88/02 | (2009.01) |

(52) U.S. Cl.
CPC ............. *H04L 51/32* (2013.01); *G06Q 10/107* (2013.01); *H04L 67/42* (2013.01); *H04W 88/02* (2013.01)

(58) Field of Classification Search
CPC .......................... G06Q 10/107; G06F 17/3089
See application file for complete search history.

(56) References Cited

U.S. PATENT DOCUMENTS

| | | | |
|---|---|---|---|
| 2006/0019699 A1* | 1/2006 | Chang ................. | G06F 17/3089 455/552.1 |
| 2009/0209335 A1* | 8/2009 | Pearce .................. | G06Q 10/10 463/30 |
| 2009/0254529 A1* | 10/2009 | Goldentouch ........ | G06F 17/241 |

* cited by examiner

*Primary Examiner* — Derrick Ferris
*Assistant Examiner* — Farhad Ali (57) ABSTRACT

A system that supports automatic blogging as well as social group interactions comprises a mobile device with a client application that is communicatively coupled over Internet to an interaction management server capable of facilitating message distribution to social groups as well as blogging of messages selectively. The client application of the mobile device comprises a message creation module that facilitates creation of a message by a user of the mobile device, a social group interaction module that communicates the message to a social group managed by the interaction management server coupled to the mobile device, and a blogging module that communicates the message as a first blog entry to blog page managed by the interaction management server.

20 Claims, 4 Drawing Sheets

SYSTEM FOR AUTOMATIC BLOGGING AND SOCIAL GROUP INTERACTIONS

CROSS REFERENCES TO RELATED APPLICATIONS

The present patent application is a continuation (CON) of, claims priority to, and makes reference to U.S. non-provisional patent, Ser. No. 13/430,522 filed on Mar. 26, 2012, entitled "SYSTEM FOR AUTOMATIC BLOGGING AND SOCIAL GROUP INTERACTIONS", which in turn is a continuation-in-part (CIP) of, claims priority to, and makes reference to U.S. non-provisional patent, Ser. No. 12/925,417 filed on 21 Oct. 2010, issued as U.S. Pat. No. 8,639,764, entitled "AUTOMATED BLOGGING AND SKILLS PORTFOLIO MANAGEMENT SYSTEM". The complete subject matter of the above-referenced United States patent applications are hereby incorporated herein by reference in their entirety.

This patent application also makes reference to U.S. patent application Ser. No. 13/170,644 entitled "SYSTEM FOR MANAGING SOCIAL GROUP INTERACTIONS," filed on 28 Jun. 2011, Publication number: US 2011/0258275 A1. The complete subject matter of the above-referenced United States patent application is hereby incorporated herein by reference, in its entirety.

BACKGROUND

1. Technical Field

The present invention relates generally to interaction using mobile devices; and, more particularly, to sharing of messages sent from a mobile device.

2. Related Art

Cell (mobile) phones are widely used as mobile devices to communicate anywhere in the world. Some of them are very simple devices capable of voice communication alone. Many other today's mobile devices are used for multiple purposes, other than voice communication, in any convenient location.

They keep record of appointments and schedules, store addresses, present calendars, surf Internet, play games among many other purposes. They are capable of playing music and other audio clips, and also play video clips and movies. They can be networked with external devices such as other mobile phones, laptops and personal computers and modems via infrared, Bluetooth and WIFI (802.11 variations) interfaces. This enormously increases their functionality when compared to just few years ago.

Today's mobile devices have some processing ability and are capable of accomplishing some tasks that were usually meant for personal computer alone. However, using emails to send information from one person to another with text seems inconvenient on mobile devices with small barely useable keyboards. In addition, sending SMS is not typically easy in languages that require use of over 30 characters in their alphabets. New forms of interactions available for PCs and laptops have not really made a move to mobile devices. In particular, some social networks such as Facebook have created a mobile app version for mobile devices. However, such apps are of limited functionality. In addition, a user's control over how his messages are displayed is limited, and not easily configurable from the mobile device.

Some software vendors such as WordPress have provided blogging features to PC and laptop based users. Blogging requires a lot of technical knowledge, especially if one has to add photos and videos to one's blog. In addition, to do anything useful, one has to learn to program in PHP or some such computer programming language or a web-based programming language—which is a deterrent to most non-technical users. There are no convenient blogging tools for mobile users. There are none that support automatically incorporating audio recorded on mobile into a blog post. It is very inconvenient and time consuming to incorporate audio, especially one recorded by a user, into a blog post. There are no known tools today that support automatic incorporation of a photo taken by a user, and voice recorded by a user, into an online blog page. These are major headaches of blogging and need to be addressed such that even the semi-literate and children can use blogging features, especially from mobile devices. The present invention address these issues.

One major need in the market is to have a shared blogging facility for groups of people who work together, such as in a project. Businesses need them, for example, to gather field level observations from people working in the field. Security of such field gathered information is a big concern too. There are no tools available today to support that, and the simple blogging tools available today are not easy to use or convenient to use for a group. There are no tools available today where users can share audio messages with each other. There are no tools available today where users can easily or automatically share a combination of video components, textual components, audio components, images from their messages with each other, either in a blog post or in a mobile messaging system.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
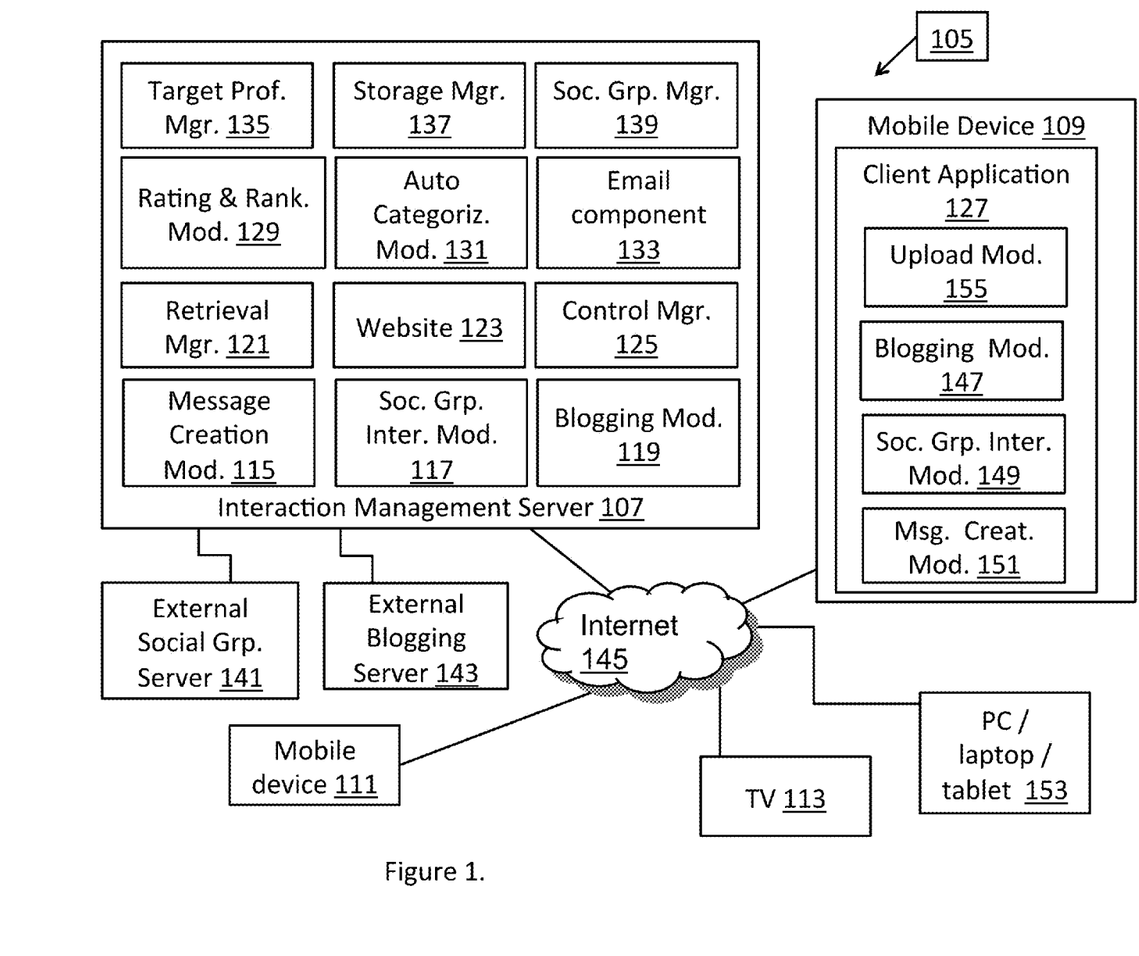
FIG. 1 is a perspective block diagram of a system that supports automatic blogging and social group interactions.

FIG. 1 is a perspective block diagram of a system 105 that supports automatic blogging and social group interactions. The system comprises a mobile device 109 with a client application 127 that is communicatively coupled over Internet 145 to an interaction management server 107 capable of facilitating message distribution to social groups as well as blogging of messages selectively. The client application 127 of the mobile device 109 comprises a message creation module 151 that facilitates creation of a message by a user of the mobile device 109, a social group interaction module 149 that communicates the message to a social group managed by the interaction management server 107 communicatively coupled to the mobile device 109, and a blogging module 147 that communicates the message as a first blog entry to blog page (for the social group or for an individual) managed by the interaction management server 107.

The client application 127 for the mobile device 109 not only captures a user message comprising textual, audio, video and digital image components for sharing with a social group and communicates the message to the interaction management server 107 or an external social group server 141 for sharing, but also communicates the message to the interaction management server 107 or an external blogging server 143 for creating an automated blog entry in an associated blog page wherein the blog page is also automatically created if necessary, in addition to automatic creation of a corresponding blog account.

The client application 127 is downloadable and the created blog page (at the external blogging server 143 or at the interaction management server 107) is shared with members of the social group, wherein an existing social group is identified by the client application 127 based on user inputs (received from the user) or user interactions (monitored and collected), or wherein the client application 127 facilitates creation of the social group in an adhoc manner by the user of the mobile device 109 (such as by selection of one or more users from the contact list to create a group).

In one embodiment, the client application 127 is downloadable and the created blog page is created as a user blog page that is a public or private, based on user preferences, and further wherein the user blog page is associated with a dynamically created blog account. Any information about, link to, or reference to the blog account, and access to the blog account is provided to the user by the client application 127 for browsing and for management purposes.

The interaction management server 107 supports blogging as well as social group interactions. It also supports management of social groups and access of blogs and social group messages (and response creations) from a mobile device 111, a television (TV) 113 (such as an IP TV or TV that works with cable based programming systems or satellite based programming systems), and a PC/laptop/tablet 153. For example, a user of the PC/laptop/tablet/153 can use a client application (such as client application 127) to access the social groups supported by the social group interaction module 117. Alternately, for example, the same user of the PC/laptop/tablet/153 can access the social groups via the website 123.

The interaction management server 107 comprises a target profile manager 135, a storage manager 137, a social group manager 139, a rating & rank module 129, an auto categorization module 131, an email component 133, a retrieval manager 121, the website 123, a control manager 125, a message creation module 115, the social group interaction module 117, and the blogging module 119. The interaction management server 107 also facilitates interactions with an external social group server 141 and an external blogging server 143. It provides access to blogging, blog review services for users of the mobile device 111, television (TV) 113 (such as an IP TV or TV that works with cable based programming systems or satellite based programming systems), and the PC/laptop/tablet 153. It also provides message creation and message review facilities for such users.

An upload module 155 in the client application 127 uploads the user recorded audio recorded component, the video recorded component, and a digital image captured in the mobile device to a third server, as part of a newly created user message, or in a response to a message received from another user that is displayed to the user.

The blogging module 119 of the interaction management server 107 is capable of creating a new blog entry in a correspond blog page associated with the social group to which the user of the mobile device 109 sends a message. If a blog page does not yet exist for that social group, the blogging module 119 creates one in an adhoc manner. It then makes a new blog post in the newly created blog page. If the user sends a new message to the interaction management server 107 and the recipient is indicated as a personal blog page, then the blogging module 119 creates a new blog entry in a correspond blog page associated with the user, making a new blog page (and a blog account too) for that user if the user does not yet have a blog page (or a blog account).

The interaction management server 107 comprises the website 123 that makes it possible to create messages, participate in group interactions, create blog entries, review blog entries of the social group as well as the individual user (if permissions are granted and access is authorized), etc. These activities are conducted by the user over the Internet, employing the PC/laptop/tablet 153 for example, or even the TV 113, for example. A mobile device that does not have a client application 127 can also use this website 123 for these purposes listed here above.

The email component 133 facilitates sending selective email notifications of new messages received, new blog entries created, or inclusion in new social groups, etc. It also supports email based creation of new blog posts, wherein emails received are forwarded to the blogging module 119 for the creation of new blog post entries, on designated blog pages, etc.

The control manager 125 facilitates access control of blogging and social group interactions, work flow control for social group interactions, conducting multi-step activities wherein blogging, user notifications, account creations and social group interactions have to occur as per some specific steps for some business purposes/business activities, etc.

The rating & rank module 129 facilitates rating of messages, blog entries and supplementary information by users, members of social groups, general public (who might browse publicly browsable sections of the blogs for example), etc. The auto categorization module 131 facilitates automatic categorizing of blog entries created (for example, based on associated message category, user specified issues flagged, message type associated, date, location, etc.) and blog entries subsequently modified. It also is capable of categorizing blog entries and messages based on content provided by the user (the content in the message, such as textual content, video content, audio content, image content, etc.).

The storage manager 137 facilitates storing of messages, forwarding of messages, archival of messages, conversions and/or compression of video components, audio components, images, text, etc. The retrieval manager 121 facilitates retrieval of messages saved, retrieval of blog entries, retrieval of work-flow scripts, retrieval of user specified configurations of social group memberships, user preferences, accounts, payment details, payment modes, etc. In one embodiment, the retrieval manager 121 facilitates retrieval of membership information in social groups managed by the external social group server 141. It also facilitates retrieval of blog entries and blog information from the external blogging server 143, as necessary.

The user of the TV 113 can participate in social group interactions managed and supported by the interaction management server 107, by reviewing messages sent by other users to the social groups, by creating new messages and sending it to them, by reviewing blog entries from blog pages associated with social groups (especially of social groups in which the user is a member), by creating blog entries, by managing personal blogs, by managing social groups in which the user is a manager, etc. It employs a version of the client application 127 in the TV 113 to provide these services to a user of the TV 113. In a related embodiment, the TV 113 does not have a version of the client application 127, and it provides similar services listed here (messaging, blogging, managing social groups, reviewing blog entries and messages, etc.) above by providing Internet 145 based access the website 123 of the interaction management server 107 (which supports these activities and related services).

The target profile manager 135 facilitates determination of potential new members for social groups, contacting them (via emails or text message, etc. for example) for inclusion into social groups, etc. It also determines potential new users/members for blog pages managed by the interaction management server 107, and targets supplementary information for users based on activities they are conducting, messages, product information and advertisements relevant to users based on their interests and previous information access patterns, consumer reviews and product and services comparison reports relevant to users, etc.

The blogging module 147 in the client application 127 essentially interacts with its complementary blogging module 119 in the interaction management server 107. Similarly, the social group interaction module 149 in the client application 127 essentially interacts with its complementary social group interaction module 117 in the interaction management server 107, and the message creation module 151 essentially interacts with its complementary message creation module 115 in the interaction management server 107. The message creation module 115 of the interaction management server 107 interacts with the blogging module 119 to get new blog pages and new blog post/entries created as necessary, for a new message received/created by a member of a social group, for example. It also interacts with the social group manager 139 to get new social groups created as instructed by a user, or new groups created based on tracking user interactions and user behavior. It interacts with the social group interaction module 117 to add a message to a social group, to forward messages from one social group to another, to send messages to recipients wherein the recipients are social groups or individual users (who have a default group assigned to them for incoming messages addressed specifically to them), etc.

In one embodiment, the interaction management server 107 facilitates interactions between a plurality of users. It comprises the message creation module 115 that facilitates creation of a message by a user, wherein the message is sent by the user from a mobile device 109 communicatively coupled to the interaction management server 107. It also comprises the social group interaction module 117 that communicates the received message from the mobile device 109 to a social group managed by it or by an external social group server 141, wherein the social group facilitates group interactions. The social group interaction module 117 presents the received message as a shared message to the plurality of users of the social group—such shared messages being accessed/reviewed by members of the social group from a TV 113, from a mobile device 111, from a PC/laptop/tablet 153 or from the mobile device 109 with the client application 127. The interaction management server 107 also comprises the blogging module 119 that communicates the received message as a user blog entry, wherein the interaction management server 107 manages or has access to at least one online blog and displays the first blog entry. The message creation module 115, based on user input, employing the social group interaction module 117 and the blogging module 119, creates corresponding shared message and/or the user blog post/entry.

The message received by the message creation module 115 comprises at least one of an audio recorded component, a video recorded component, a text data entry, and a digital image captured in the mobile device 109 (using the client application 127) by the user. The mobile device 109 is one of a cellular phone, a PDA, a tablet device, a voice-over-IP device, an e-book reader, an MP3 player, a game console, a handheld TV, a set-top-box, a camera and a camcorder. The interaction management server 107 interacts with the mobile device 109 to receive the message and communicates it to the social group as well as presents it on a blog as a user blog entry on a corresponding blog page.

The interaction management server 107 further comprises an email component 133 that communicates the message as an email to the plurality of users who are members of the social group. The email component 133 also receives a response to the message from the mobile device 109 or from email clients in other mobile devices 111 (and PC/laptop/tablet 153) and inserts it as a response blog entry (as a response post to an existing blog post, for example) in the blog page for the corresponding social group or user.

In one related embodiment, the message received by the interaction management server 107 (from the mobile device 109) also comprises at least a user specified category information and a user specified issue information. The blogging module 119 associates the user blog entry with the user, a date, the user specified category information and the user specified issue information. The blogging module 119 makes the user blog entry retrievable employing the identification of the user, a portion of the date, the user specified category information or the user specified issue information.

For a given user message, the category, issue, message type, user name, date, etc. are used as blog entry title, and possibly, even as blog page title in one embodiment. Both blog page and blog entry are created on the fly, programmatically, by the interaction management server 107. Private or shared blog pages are created based on group settings and user preferences. If a group has a group blog page, then users sending messages can make blog posts to them, or choose to create private blog posts to their personal blog page. It is also possible for a first user sending a message to make a blog post into the personal blog page of a second user who is the intended individual recipient of a message by the first user.

In one embodiment, the interaction management server 107 receives a blog page title, blog post content, date, username, message image url, message audio url, etc. from the client application 127 of the mobile device 109, for example, over a HTTP connection (such as over Internet 145, for example) from a HTTP POST message. The interaction management server 107 then makes a new blog post (also referred to as blog entry), and saves records in a blog tool (such as WordPress, for example) managed by or associated with the blogging module 119, to create a blog post entry that show audio playback, image display, video display and textual display. The blog tool (associated with, managed by, or part of blogging module 119) makes a new page if necessary, for that social group or user. Before creating a new blog page, the blog tool first checks to determine if social group or corresponding user has a blog page already available, or a new one needs to be created. If it determines that a blog page already exists, then the blog tool uses that blog page. Otherwise, it creates a new blog page for user or social group and then makes a new blog post.

Specifically, in one embodiment, the blog tool associated with, managed by or part of the blogging module 119 is a WordPress tool (commercially available blogging software), and, before making a new blog page for a social group or user, the interaction management server 107 checks to see if a blog page already exists for the user or social group, in the "afblog_posts table", using a post_type field (which has values 'page', 'post', 'revision', etc.). An appropriate unique user 'post_title' field value is used to see if blog page already exists. Or, a 'post_name' field is alternately used to identify or retrieve a blog page, or to see if blog page exists for the corresponding user or social group. Also, a category is created for the blog posts, and the page title for the blog page is used as category name. Thus, all blog posts are given that category in blog posts/entries. Thus, the title of the blog page is associated with blog posts that are associated with it, and the category is the means of representing this association. If the category does not yet exist when a new blog page is to be created, the category is created. Thus a new category is created as shown below:

```
$cat_ID = get_cat_ID( $_POST["pagetitle"] );
        if($cat_ID == 0) {
            $cat_name = array('cat_name' => $_POST["pagetitle"],
                'category_description'
=> 'A category for a group with title of group as category name',
'category_nicename' => 'category-slug', 'category_parent' => '');
            wp_insert_category($cat_name);
        }
```

Thus, if a blog page does not exist, the interaction management server 107 (actually, the blogging module 119 in the interaction management server 107) makes the blog page first before adding the blog post (essentially, a user created message is saved as a blog post, which is associated with a blog page for the corresponding social group, user or recipient).

```
$new_post = array(
    'post_title' => $_POS["pagetitle"], // for page
    'post_content' => "This is a blog for ". $_POST["pagetitle"],
    'post_status' => 'publish',
    //'post_date' => date('Y-m-d H:i:s'),
    //'post_date' => $_POST["date"], // if you use this, make
sure date from client is correct, as client may have wrong date
    'post_author' => $_POST["username"],
    'post_type' => 'page', // page is the post_type
    'post_category' => array($new_cat_ID) // use title of
page for category );
    $pag_new = wp_insert_post($new_post);
```

Once a new page is ready, or an existing page is located, a new post is created (for example) as follows:

```
// new page ready, now add new post to page
// make post category same as name of page (may require adding a
category and // getting its id)
// $cat=get_cat_ID($post->post_title); //use page title to get a
category // page does exist now, add post
    $new_post = array(
        'post_title' => $_POST["blogevent"], // title for post
        'post_content' => $_POST["content"],
        'post_status' => 'publish',
        //'post_date' => date('Y-m-d H:i:s'),
        //'post_date' => $_POST["date"], // use this, if you feel
date from client is correct
        'post_author' => $_POST["username"]
        'post_type' => 'post', // this is a post
            // 'post_category' => [ array(<category id>, <...>) ] //Add
            // some categories. Categories need to be passed as an array
            // of integers that match the category IDs in the database.
        'post_category' => array($new_cat_ID) // use
    pagetitle for category );
    $post_id = wp_insert_post($new_post);
```

The image and audio file URLs are accessed, processed, and saved as attachment to the new blog post (for example), as follows:

```
// first determine filetype, then use post_id to add image
// then "wp_insert_attachment", returns the attachment 'id.
$wp_filetype = wp_check_filetype(basename($_POST["image"]), null );
extract($wp_filetype);
if (!$type) $type = "image/jpeg"; // this can be made such that it is based on extension
// if filetype does not have a mimetype, set it to image/jpeg
$attachment = array(
//'post_mime_type' => $wp_filetype['type'],
'post_mime_type' => $type,
'post_title' => preg_replace('/\.[^.]+$/', '', basename($_POST["image"])),
'post_content' => '',
'post_status' => 'inherit'
);
$attach_id = wp_insert_attachment( $attachment, $_POST["image"], $post_id );
$attach_data = wp_generate_attachment_metadata( $attach_id, $_POST["image"] );
// following wp_update_attachment_metadata may be unnecessary
wp_update_attachment_metadata( $attach_id, $attach_data );
//Now add metadata for audio url
$wp_filetype = wp_check_filetype(basename($_POST["audio"]), null );
extract($wp_filetype);
if (!$type) $type = "audio/aac"; // this can be made such that it is based on file name
extension
$attachment = array(
//'post_mime_type' => $wp_filetype['type'],
```

```
    'post_mime_type' => $type,
        'post_title' => preg_replace('∧.[^.]+/', '', basename(    $_POST["audio"])),
        'post_content' =>'',
        'post_status' => 'inherit'
        );
        $attach_id = wp_insert_attachment( $attachment, $_POST["audio"], $post_id );
        $attach_data    =    wp_generate_attachment_metadata( $attach_id,
$_POST["audio"] );
```

Thus, in one embodiment, in the blogging module 119, a new blog page is created if necessary, a new blog post is inserted, and audio and image files (and video files too if available) are stored as attachments, and associated with the blog post. The category of the new post is set to the name of the blog page, i.e. the title of the blog page. That way, it is possible to pull in all posts based on blog name, just by selecting the category of that name.

The social group is used for a business in one embodiment, wherein the workers of the business interact in a closed box social group with restricted membership and confidential messages. The corresponding blog pages and blog entries are kept private with access provided only to the members, and blog access (to read the blog pages) controlled by username/password validation, or by means of secure transportation layer protocols that authenticate the client. The access to messages from the website 123 of the interaction management server 107 are similarly controlled by at least a username/password security. The users for the business can create messages to interact with each other, send messages to individuals or to whole groups, and blog their messages too, either in personal blogs (one blog page for each individual for their blog posts, for example) for in shared blog pages assigned to the whole group.

In one embodiment, the blogging module 147 of the client application 127 communicates the new message created by the user message as a blog entry, for example, employing an HTTP POST command over an HTTP communication link, and the interactive media management server 107 manages the online blog and displays the blog entries created.

One major need in the market is to have a shared blogging facility for groups of people who work together, such as in a project. Businesses need them for example, to gather field level observations from people working in the field. The present invention adequately supports that with easy to use client application 127 for mobile devices 109,111 that interacts seamlessly with the interaction management server 107 for automated blogging and secure message creation and sharing. Security of such field gathered information for businesses is a big concern too, and the present invention employs username/password for validation, conducts authorization checks on the mobile device and the server as necessary, and employs transport level mutual authentication if necessary (employing SSL and TLS, for example). There are few tools available today to support that, but none of them are easy to use or convenient, and the present invention addresses this deficiency for business users. Additionally, the present invention provides a service where users can share audio messages with each other. It also makes it easy for users to easily and automatically share a combination of video components, textual components, audio components, images from their messages with each other, either in a blog post or in a mobile messaging system.

In one embodiment, the blogging module 119 is a Java-based server-side software that provides a blogging service, wherein the user can create blog entries from messages sent from the mobile device 109, and subsequently review these blogs using the website 123 that accesses the blogging module to retrieve blog posts and display them to the user. The user using the website 123 is prompted to, for example, select a category of blog (such as SPORTS, AGRIBUSINESS, ENTERTAINMENT, etc.) then select a region from a set of regions supported (such as Orange County Calif., Northern California, Chicago Area, etc.), which then provides the user with a list of relevant publicly viewable social groups for the user to select from. If the user selects one of the listed social groups, a blog page is dynamically generated and displayed for the user, with blog posts that correspond to the messages received by the interaction management server 107 for the associated social group. Similarly, for private social groups, such as those for workers from a business who work on a common project, the user using the website 123 can select the relevant blog by providing an organization identification and then a project identification, which results in providing a list of relevant business related blogs, and the user can review them after providing a username/password combination (and other business specified security codes and security validations) that authorizes them before providing access to the secure data in the form of blog posts on an associated blog page. The appearance of any blog page can be customized to the social groups, and headers, footers, links can be provided based on preferences of the business or its social groups. Each post in a display blog page comprises textual component provided by a user as a message, a video component (if any), an audio component (if any), one or more images (if any) that are all provided by a user as part of a message sent from the mobile device 109 (or created on the website 123 instead for social interactions employing appropriate message creation webpages). Thus, a blog page can be identified by a user for review purposes employing an organization identification, business group identification, etc. in one embodiment and similarly by specifying/selecting a category, a region, and other details in another embodiment. Security information are solicited from the user and used as required. Other ways of locating relevant blog pages for a user are also contemplated, such as user specific authorization of social groups that help retrieve all relevant social groups for a given user based on what social groups/blogs the user is authorized to use/review.

The interaction management server 107, in one embodiment, employs the external social group server 141 to facilitate social group interactions and the external blogging server 143 to facilitate blogging. It receives messages from the client application 127 and forwards it to the external social group server 141 and the external blogging server 143, after saving the audio, video, text, images, as necessary, at some storage (employing the storage manager 137, for example), or after processing these components as necessary (such processing may include, if necessary, conversion of formats for video, audio, images, etc.). It also, at the same time, employs the email component 133 to send notification to recipients (members of a social group or subset thereof, for example) and to even send messages across (employing an XML document structure, or an HTML content formats, for example) to email clients such that the users can receive them and review the messages, and even respond back via email clients, wherein the responses are processed by the email components and response message are created as necessary, and response blog posts are also created as necessary (and saved in the blog/database associated). Similarly, the interaction management server 107 optionally employs an SMS component to communicate information on availability of messages and new blog posts to members of the social groups and other recipients. It can also communicate at least a portion of the messages in such SMS notifications. It also employs a chat component to send notifications/communicate information on availability of messages and new blog posts to members of the social groups and other recipients, or even send at least a portion of the messages in such chat notifications.

Figure 2:
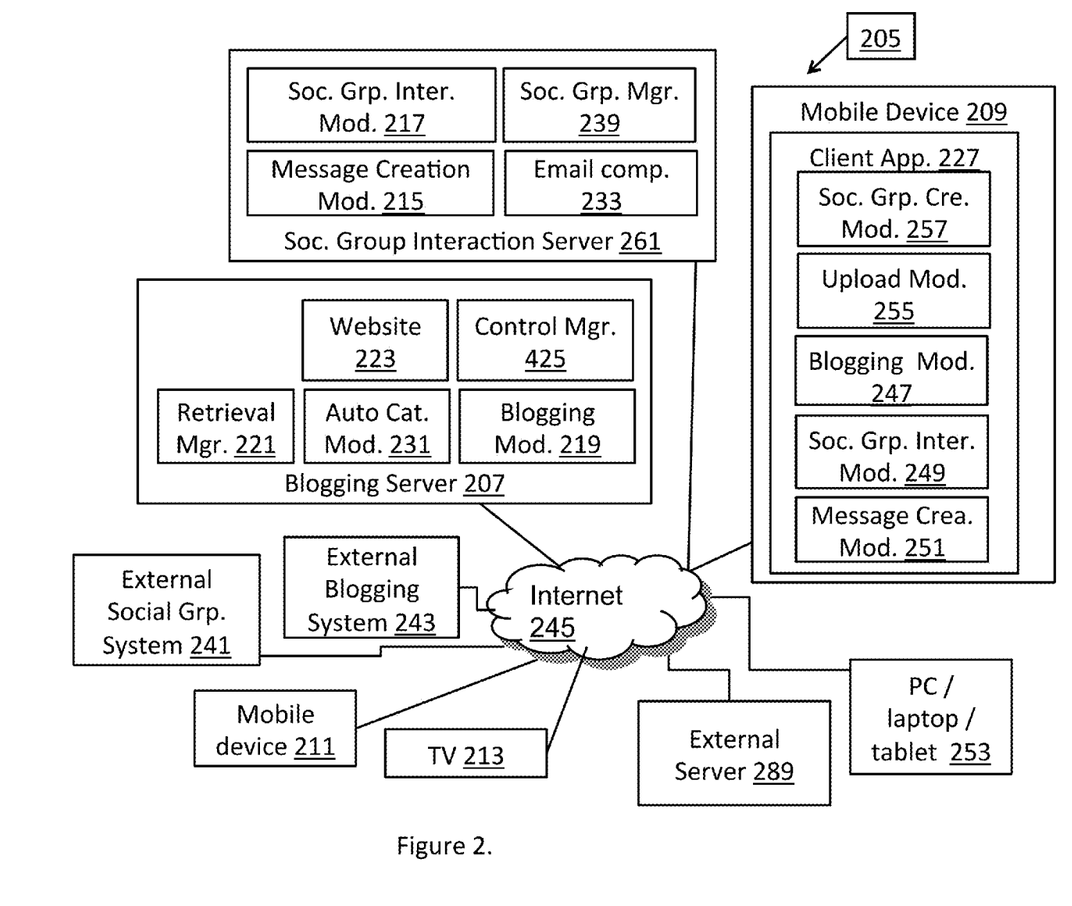
FIG. 2 is a perspective block diagram of another system that supports automatic blogging and social group interactions.

FIG. 2 is a perspective block diagram of another system 205 that supports automatic blogging and social group interactions. The system comprises a mobile device 209 with a client application 227 that is communicatively coupled over Internet 245 to a blogging server 207. The client application 227 of the mobile device 209 comprises a message creation module 251 that facilitates creation of a message by a user of the mobile device 209, a social group interaction module 249 that communicates the message to a first server, such as the social group interaction server 261 communicatively coupled to the mobile device 209, and a blogging module 147 that communicates the message as a first blog entry to a second server, such as the blogging server 207, coupled to the mobile device 209.

In one embodiment, the user of the mobile device 109 can cause blog entries from messages to be created on the external blogging server 143. Similarly, social groups managed by the external social group server 141 can be accessed, and group interactions conducted, from the mobile device 109 using the client application 127.

The first server 261 manages a social group for group interactions and presents the message as a shared message for the social group. The blogging module 247 communicates the message created by the user of the mobile device 209 as a first blog entry to the second server 207 (the blogging server 207) coupled to the mobile device 209, wherein the second server 207 manages an online blog and displays the first blog entry (on an appropriate blog page, for example).

The message creation module 251 selectively, based on user input, interacts with at least one of the first server 261 and the second server 207 to communicate the message and create corresponding shared message (on the social group interaction server 261) and/or the first blog entry (on the blogging server 207). The client application 227 supports, via the message, social group interactions and automatic blogging, selectively for the user or the social group. The sending of a new message or a response to a message requires a user to specify recipients, and the user can select one or more recipients (group members for example), the whole group (all members of a social group) or one individual member as recipients. Similarly, the user sending the message can specify if a blog entry should be created in addition to sending of the message, or in lieu of sending the message to the social group or a subset thereof. A blog entry can be made for a page associated with the whole social group, for a page associated with an individual member of the social group, or on a blog page associated with the user/sender of the message, etc.

The client application 227 facilitates creation of a message by a user. The message comprises at least one of an audio recorded component, a video recorded component, a text data entry, a voice-over-IP device, and a digital image captured in the mobile device 209 by the user. The mobile device 209 is one of a cellular phone, a PDA, a tablet device, an e-book reader, an MP3 player, a game console, a handheld TV, a camera and a camcorder.

The client application also comprises a social group creation module 257 that facilitates creation of social groups (such as by selecting one or more members from a contact list for example) and the display of messages received from other members of the social group. Similarly, the blogging module 247 also facilitates viewing of blog pages from the online blog on the mobile device 209. The blogging module 247 of the client application 227 communicates user identification, a blog page identification, a blog post identification, a date, a post title, the audio recorded component, the video recorded component, the text data entry, and the digital image captured to the second server 207 for blogging the first blog entry.

The message creation module 251 facilitates creation by the user of the message and the client application 227 shares the message with a social group, and also automatically blogs the message in a blog page on the online blog associated with the social group or a blog page associated with the user. The user's message comprises the audio recorded component, the video recorded component, the text data entry, and the digital image is automatically blogged by the client application at the second server, at an external blogging system, also selectively archived as evidence or observations with associated timestamp and digital signatures in a database. For example, businesses sometimes need to gather field observations from a group of field workers and have them saved in a database for subsequent processing. Attorneys or policemen who may want to gather evidence and record them prefer to have timestamps created and digital signatures provided that can help with non-repudiation and subsequent validation.

The client application 227 automatically registers the user for a blogging account and creates a corresponding user blog for the user when the user sends the first blog entry to the second server 207, wherein the user blog created is selectively made as a private blog accessible only by the user and his selected friends or as a public blog accessible publicly, based on user preferences.

In one embodiment, the client application 227 automatically creates a blogging account and a even corresponding new social group blog for the social group (if it does not yet exist) when the user sends the first blog entry to the second server 207 (the blogging server 207), wherein the social group blog is selectively created as a private blog accessible only by members of the social group or as a public blog accessible by everyone including non-members, based on user preferences and on associated social group settings.

In one embodiment, the social group creation module 257 automatically creates a user group based at least in part on a history of phone calls, emails and text messages sent by a user. It also facilitates selection of users from a contact list and incorporation of the selected users into an existing group, or organizing them into a new group, for social group interactions. The client application 227 facilitates automatic blog page creation by instructing the second server 207 to create a blog employing the name assigned to the new group for a blog page title while also incorporating a message category (associated with an individual message, for example) and a message issue as part of the title for the first blog entry.

The client application 227 facilitates automatic blog page creation by instructing the second server (blogging server 207) to create a blog employing the name employed by a user group for a blog page title, and a combination of at least one item from a set comprising a date, user identification, user specified message category and user specified message issue for a title for the first blog entry.

An upload module 255 in the client application 227 uploads the user recorded audio recorded component, the video recorded component, and a digital image captured in the mobile device to a third server, as part of a newly created user message, or in a response to a received message from another user that is displayed to the user. The message creation module 251 assembles the message, employing universal resource location information into the message that is sent as the first blog entry to the second server 207 and as the shared message to the first server 261.

The client application 227 not only captures a user message comprising textual, audio, video and digital image components for sharing with a social group and communicates the message to a social group interaction server 261 for sharing, but also communicates the message to a blogging server 207 for creating an automated blog entry in an associated blog page wherein the blog page is also automatically created if necessary, in addition to automatic creation of a corresponding blog account.

In one embodiment, the client application 227 is downloadable. The created blog page is shared with members of a social group, wherein an existing social group is identified by the client application 227 based on user inputs or user interactions, or wherein the client application 227 facilitates creation of the social group in an adhoc manner by the user of the mobile device 209.

The created blog page at the blogging server 207 is created as a user blog page that is a public or private, based on user preferences, and further wherein the user blog page is associated with a dynamically created blog account, wherein information about, link or reference to, and access to the blog account is provided to the user by the client application 227 for browsing and for management purposes.

The blogging server 207 receives a blog page title, blog post content, date, username, message image url, message audio url, etc. from the mobile device 209, for example, over a HTTP connection via a HTTP POST message. The blogging server 207 then makes a new Blog entry, and saves records in a blog tool (such as WordPress) to create a blog post entry that show audio playback, image display, video display and textual display. The blog tool makes a new page if necessary, for that social group or user. Before creating a new blog page, the blog tool first determines if social group or user has a page already, or a new one needs to be created. If it determines that a blog page already exists, then the blog tool uses that blog page. Otherwise, it creates a new blog page for user or social group and then makes a blog post.

Specifically, in one embodiment, the blog tool used in the blogging server 207 is a WordPress (commercially available) tool, and before making a new blog page for a social group or user, the server checks to see if a blog page already exists for the user or social group, in the "afblog_posts table", using post_type field (which has values 'page', 'post', 'revision', etc. An appropriate unique user 'post_title' field value is used to see if blog page already exists. Or a 'post_name' field is alternately used to identify or retrieve a blog page, or to see if blog page exists for user or social group. Also, a category is created for the blog posts, and the page title for the blog page is used as category name. Thus, all blog posts are given that category in blog entries. Thus, the title of the blog page is associated with blog posts that are associated with it, and the category is the means of representing this association. If the category does not yet exist when a new blog page is to be created, the category is created. Thus, if a blog page does not exist, the server makes the blog page first before adding blog post. The image and audio components of a new blog post (created from a new message sent from the client application 227) are identified by URLs for uploaded files, wherein these URLs are accessed, processed, and saved as attachment to the new blog post.

The social group that a user participates in, can be personal social groups created by the user of the mobile device 209, or social groups assembled by a business the user associates with (or works for), etc. The social groups supported by the social group interaction server 261 is used for a business in one embodiment, wherein the workers of the business interact in a closed box social group with restricted membership and confidential messages. The corresponding blog pages and blog entries at the blogging server 207 are kept private with access provided only to the members, and blog access (to read the blog pages) controlled by username/password validation, or by means of secure transportation layer protocols that authenticate the client. The access to messages from the website 223 of the blogging server 207 are similarly controlled by at least a username/password security. The users for the business can create messages to interact with each other, send messages to individuals or to whole groups employing the social group interaction server 261, and blog their messages too, either in personal blogs (one blog page for each individual for their blog posts, for example) for in shared blog pages assigned to the whole group, wherein the blogs are facilitated by the blogging server 207.

The social group interaction module 217 of the social group interaction server 261 receives messages communicated by the social group interaction module 249 of the mobile device 209. Thus, a created message is sent to the social group interaction server 261 that is communicatively coupled to mobile device 209 for sharing it with one or more social groups. In one embodiment, the social group interaction server 261 and the blogging server 207 are integrated into one interactive media management server.

The blogging module 247 communicates the message as a blog entry, for example, employing an HTTP POST command over an HTTP communication link, to a the blogging server 207 coupled to the mobile device 209. In one embodiment, the blogging server 207 manages the online blog and displays the blog entries created, enforcing security requirements specified by a user or by a corresponding social group.

In one embodiment, the client application 227 automatically creates a blogging account and a corresponding social group blog for the social group when the user sends the first blog entry to the blogging server 207, wherein the social group blog is selectively made as a private blog accessible only by members of the social group or as a public blog, based on user preferences and on associated social group settings.

Figure 3:
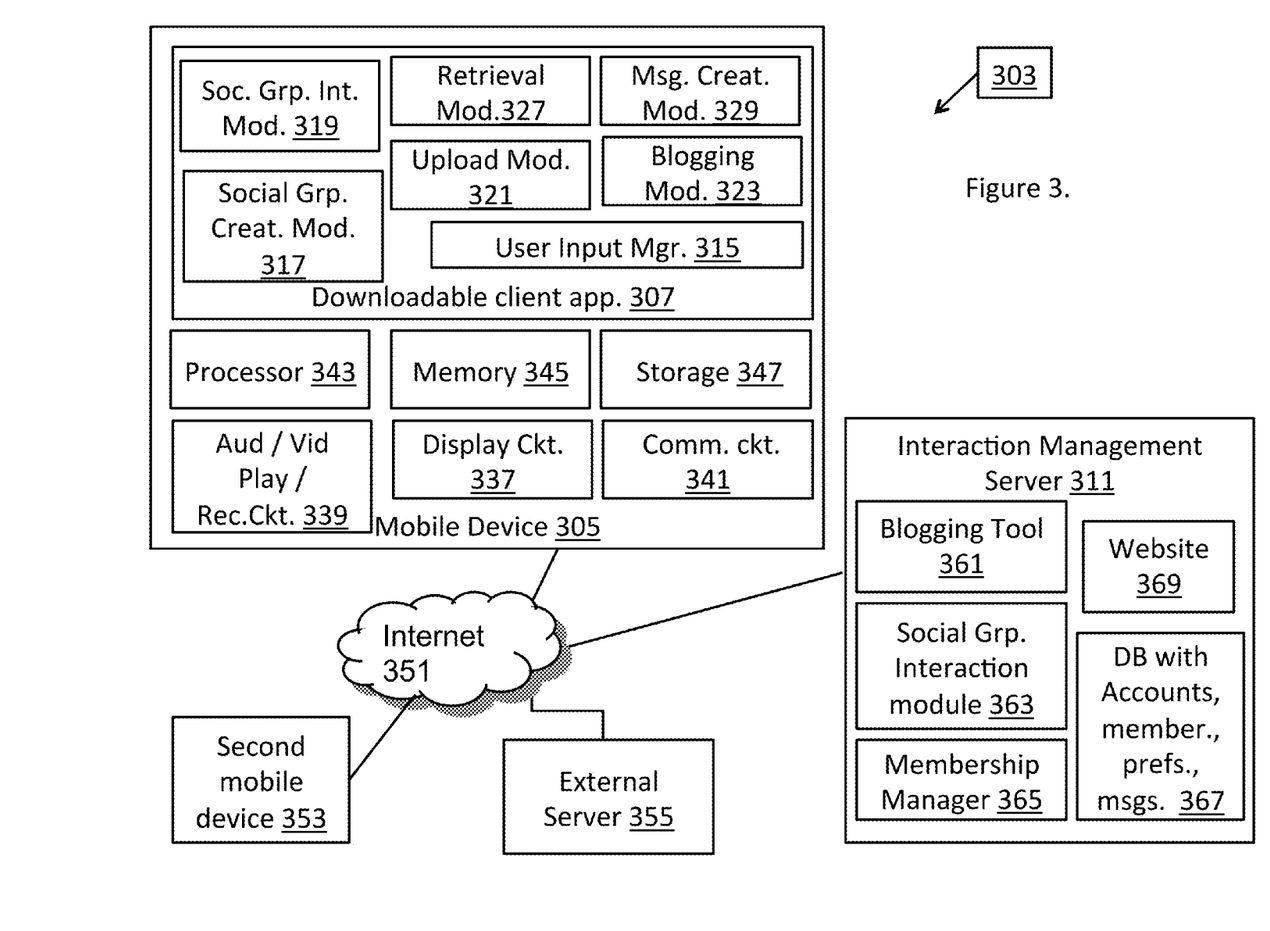
FIG. 3 is a perspective block diagram of an exemplary system that facilitates blogging and message based social group interactions from a mobile device, wherein the mobile device comprises a downloadable client application that interacts with an interaction management server.

FIG. 3 is a perspective block diagram of an exemplary system 303 that facilitates blogging and message based social group interactions from a mobile device 305, wherein the mobile device 305 comprises a downloadable client application 307 that interacts with an interaction management server 311. The mobile device 307 comprises a downloadable client 307, a processor 343, a memory 345, a storage 347, an audio/video playback and recording circuitry 339, a display circuitry 337 (touch sensitive screen based display circuitry in one embodiment), and a communication circuitry 341 (that supports Internet based communication, cellular communications as well as local communication such as Wifi and Bluetooth). The downloadable client application 307 that interacts shares messages, blog entries with a second mobile device 353 over local communications means (WiFi, Bluetooth, IR, etc.). it also interacts with an external server 355, such as an external blogging system, to post blog entries, to share information, to search for social group information, and to store messages for public consumption.

The downloadable client 307 comprises a social group interaction module 319, a social group creation module 317, a retrieval module 327, an upload module 321, a message creation module 329 and a blogging module 323. It also comprises a user input manager 315 that solicits user inputs, receives user responses, processes user responses, etc. The interaction management server 311 comprises a blogging tool 361 (such as a WordPress blogging tool in one embodiment, or a JSP based blogging service in another embodiment), a social group interaction module 363, a membership manager 365, a website 369 and a database with accounts, membership information, user preferences, messages from one or more social groups, etc.

The database with accounts, membership, user preferences and messages 367 (database for short) makes it possible to gather, process, track user behavior, user patterns, user relationships adhoc social groups for a user. It supports automatic archiving, report generation and billing for services.

In one embodiment, the client application 307 automatically creates a blogging account and a corresponding social group blog for the social group when the user sends the first blog entry to the interaction management server 311, wherein the social group blog is selectively made as a private blog accessible only by members of the social group or as a public blog, based on user preferences and on associated social group settings.

The client application 307 comprises the social group creation module 317 that automatically creates a user social group based at least in part on a history of phone calls, emails and text messages sent by a user. The social group creation module 317 facilitates selection of users from a contact list and incorporation into an existing group or organizing into a new group for social group interactions. The blogging module 323 of the client application 307 communicates a user identification, a blog page identification, a blog post identification, a date, a post title, the audio recorded component, the video recorded component, the text data entry, and the digital image captured to the interaction managements server 311 for blogging a message as a blog entry.

The mobile device 305 is capable of sharing a message (received from a social group, for example) or a blog page/blog post currently viewed by a user, with a second mobile device 353, employing local communication means such as Bluetooth, etc. The members of a social group can call send messages to each other, to individual members (if they select one or more individual members of a social group as recipients to a message), or to the whole group. These messages are also collected in a blog associated with a social group, such as a blog for a field extension team wherein members report observations from the field and all observations are automatically collected into a blog. Similarly, individual members can maintain their own blogs, and a user can elect to have all his messages also be collected into a member specific blog. Again, based on user preferences or policy of a social group, the messages sent from a mobile device, such as the mobile device 305, are either sent to the social group, blogged in an associated blog page, or both (blogged as well as sent as a message to all the members of the social groups or a subset thereof).

In one embodiment, the interaction management server 311 facilitates "crowd-sourcing" with flexibility of syndication, wherein any user with a client application 307 can send messages that are saved, processed, communicated to other members of one or more social groups for sharing, and also optionally blogged. For example, during a sports event, all users can send messages, with audio recordings, video recordings, photos taken as digital images, and typed textual content, and for a configurable duration of a few hours such messages are received by the interaction management server 311, the messages are processed, added as entries to a social group expressly created for that sports event, and the messages are also entered automatically into a blog created for that sports event. The configurable duration serves as an "open window" during which all messages are accepted, processed and selectively made available for review via a blog, or via social group message interacts, or both. Thus collecting current local sports content from spectators and providing Newspapers and Publishers means to access such content is facilitated by the present invention, and the combination of the downloadable client application 307 that captures messages and communicates it, and the interaction management server 311 that receives the messages and shares it in more than one way (social group messages, blogs, emails, notifications over SMS, etc.) enables such innovative crowd sourcing solutions. Both businesses and users can benefit from this solution. For example, it can be used for automated blogging of news contributed by any user in a region that can be retrieved and reviewed by local news and sport information consumers. Thus, at a local sports event—players, kids and their parents can make new messages by taking photos on their mobile phones, recording comments, etc. and sending them to the interaction management server 311, which automatically collects such photos, videos, and audio comments into a blog for a school or a club. It then provides automated blog for that local sports event from those collected photos/comments/videos/text messages for access by online users over Internet 351 and the website 369 (for example). Therefore, the blogs created using the blogging tool become available online for local/regional users. The interaction management server 311 also makes the automated blogs available for newspapers, TV stations, radio as syndication (incorporation into TV news, print). In a related embodiment, these blog posts and messages are shared with TV stations, radio companies, newspaper companies employing RSS (Really Simple Syndication) and other means of syndication or web feed formats.

In one embodiment, the interaction management server 311 creates and manages social groups for local schools and the students of the local schools interact using the social group interaction module 363—they send messages after they take photos, record audio, video on the mobile device 305, and the students create messages that are sent to the social group interaction module by the downloadable client application 307, where they are collated as a blog on school sports events, as well as shared in the social groups as messages. Similarly, youth oriented sports clubs can create social groups on the interaction management server 311 and encourage the parents of their youth members to contribute to automated blogs created for individual club games using a downloadable client application 307 on their mobile devices 305.

Figure 4:
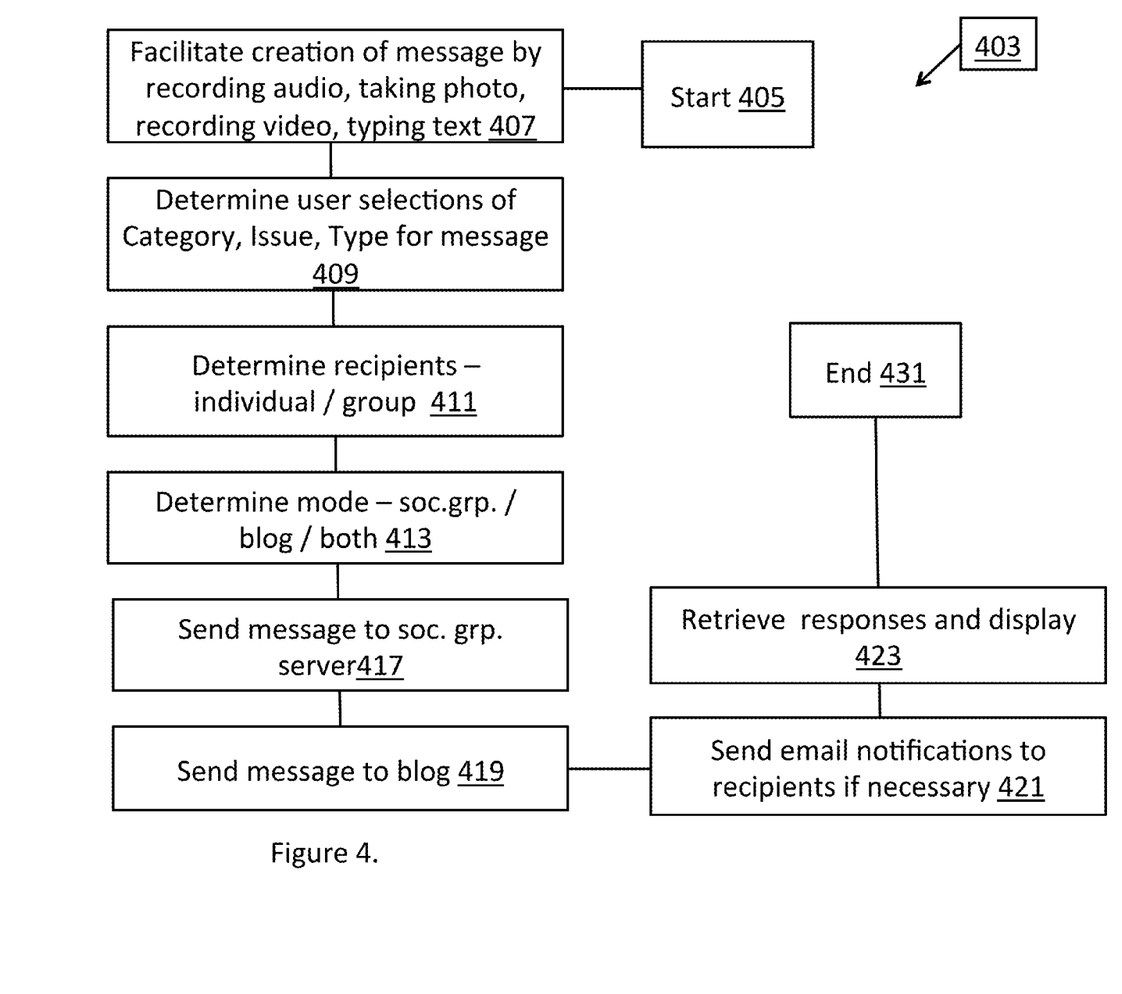
FIG. 4 is a flow chart of an exemplary operation of a system for automatic blogging and social group interactions via messaging, in accordance with the present invention.

FIG. 4 is a flow chart of an exemplary operation of a system for automatic blogging and social group interactions via messaging, in accordance with the present invention. The operation starts at a start block 405 when a user starts the client application 307 in the mobile device 305. Then, at a next block 407, the client application facilitates creation of a message by the user, by recording audio message component, by capturing a photo (digital image) taken by the user (such as by using a camera on board the mobile device 305), by recording a video employing the audio/video playback & recording circuitry 339, by accepting user textual input (via a keyboard for example), etc. Then, at a next block 409, the client application determines user selection of a category, issue and message type for the message created, which are associated with the message when it is sent to a server. Default values are also assigned if user does not provide these selections.

Then, at a next block 411, the client application 307 determines recipients for the message—and it can be individual members of a social group, or the entire social group, etc. At a next block 413, the client application 307 determines the mode of distributing the message—as a message for social group interaction, as a blog entry for the social group, as a blog entry for the individual user (such as for a private blog managed by the individual), a message sent to a new group formed in an adhoc manner by the user by selecting contacts from a contact list, etc.

Then, at a next block 417, is necessary, the message is sent to a social group server. Then, at a next block 419, the message is sent to a blogging server for blogging it as a new post based on user specifications. Then, at a next block 421, email notifications are optionally sent to recipients (if necessary) to let them know that a new message is available, Then, responses if any are retrieved at a next block 423 and displayed.

Finally, at a next end block 431, the processing terminates.

The terms "circuit" and "circuitry" as used herein may refer to an independent circuit or to a portion of a multi-functional circuit that performs multiple underlying functions. For example, depending on the embodiment, processor or processing circuitry may be implemented as a single chip processor or as a plurality of processing chips. Likewise, an audio/video playback/recording circuitry may be combined in one embodiment into a single circuit or, in another embodiment, operate independently perhaps in separate chips. Similarly, a display circuitry may be combined in one embodiment into a single circuit or, in another embodiment, operate independently perhaps in separate chips. The communication circuitry may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A mobile device comprising a processor, memory, storage, an audio and video playback and recording circuitry, a display circuitry, a communication circuitry and camera, the mobile device configured to execute a client application, the client application comprising:
   a message creation module that creates a message based at least on user provided category, issue and message type;
   a social group interaction module that shares the message with a social group based at least on the category, issue and message type;
   a blogging module that communicates the message as a first blog entry;
   the client application communicates the message using the social group interaction module and the blogging module thereby simultaneously creating a shared social group message as well as the first blog entry; and
   wherein the message and the blog entry are digitally signed for non-repudiation and validation.

2. The mobile device of claim 1 wherein the message is shared with a social group whose membership is controlled based on an organization identification or business group identification.

3. The mobile device of claim 1 wherein the social group is employed by workers of a organization who work on a common project, and wherein the social group is identified by providing an organization identification and a project identification.

4. The mobile device of claim 1 wherein the client application determines the mode of distributing the message as a message for social group interaction, as a blog entry in a shared blog for the social group, as a personal blog entry for the individual user, or as a message sent to a new group formed in an adhoc manner by the user by selecting contacts from a contact list.

5. The mobile device of claim 1 wherein the user of the mobile device can cause the first blog entry to be created, based on the message, on an external blogging server.

6. The mobile device of claim 1 wherein the social group is managed by the external social group server that is accessed by the client application, wherein the client application also facilitates group interactions with other members of the social group.

7. The mobile device of claim 1 wherein notification regarding the availability of the message and of the first blog entry is communicated to members of the social groups and to other recipients.

8. The mobile device of claim 1 wherein the messages shared by the social group are field observations gathered from a group of field workers, wherein the social group comprises the field workers as members, and wherein the blog entries created from the field observations are accessible only by the group of field workers.

9. The mobile device of claim 8 wherein the field observations are evidence gathered by policemen and law enforcement, wherein the field observations have timestamps created and digital signatures provided that can help with non-repudiation and subsequent validation.

10. The mobile device of claim 1 wherein the client application is configured to automatically create a blogging account and even a corresponding new social group blog when the user sends the first blog entry to a blogging server, wherein the social group blog is selectively created as a private blog accessible only by members of the social group or as a public blog accessible by everyone including non-members, based on user preferences and on associated social group settings.

11. A mobile device comprising a processor, memory, storage, audio recording, video recording, digital image capture, text input and communication circuitry, the mobile device configured to execute a client application to provide client services, wherein the client application, during operation:
   captures, employing a message creation module, a user message comprising textual, audio, video and digital image components for sharing with a social group, wherein the user is also prompted to provide a category, issue and message type for the message created;
   communicates, using a social group interaction module, the message to a social group server;
   simultaneously communicates the message to a blogging server, using a blogging module, for creating an automated blog entry in an associated blog page;
   wherein access to the social group and the associated blog page is controlled employing an organization identification and a project identification.

12. The mobile device of claim 11 wherein the blog page is automatically created by the client application if necessary, in addition to automatic creation of a corresponding blog account for the user.

13. The mobile device of claim 11 wherein the client application automatically creates a social group membership for the user in the social group, as well as a blog account at the blogging server, when the user makes creates an initial message.

14. The mobile device of claim 11 wherein the client application facilitates a blog page retrieval for review by a user employing one or more of an organization identification, a business group identification, a category, a region, and other related details.

15. The mobile device of claim 11 wherein the client application facilitates a blog page retrieval for review by a user employing user specific authorization of social groups, whereby a user can retrieve all relevant social groups among a plurality of social groups, based on a current authorization of the user to use and review the plurality of social groups.

16. A server for interactions between a plurality of users, the server comprising:
   a processor, memory, storage and communication circuitry, the processor configured to execute a plurality of modules;
   a message creation module that facilitates creation of a message by a user, wherein the message is sent by the user from a mobile device communicatively coupled to the server;
   a social group interaction module that communicates the received message from the mobile device, to a social group managed by the server;
   a blogging module that communicates the received message as a blog entry, wherein the server manages or has access to an online blog and displays the blog entry;
   the message creation module, based on user input, employing the social group interaction module and the blogging module, creates corresponding shared message as well as the blog entry as necessary;
   wherein the user is also prompted to provide a category, issue and message type for the message created; and
   wherein the user is prompted to provide an organization identification and a project identification in order to access the social group or retrieve the blog entry from the online blog.

17. The server from claim 16 wherein the message received by the message creation module comprises at least one of an audio recorded component, a video recorded component, a text data entry, and a digital image captured in the mobile device by the user.

18. The server of claim 17 wherein the blog entry is made, based on preferences, for a page associated with the whole social group, for a page associated with an individual member of the social group, or on a blog page associated with the user creating the message.

19. The server from claim 16 wherein the social group and the blog are used to gather field observations from a group of field workers wherein the observations are created with associated timestamps and digital signatures to help with non-repudiation and subsequent validation.

20. The server from claim 16 wherein the social group interaction module is used to manage business interactions for an organization, wherein the workers of the business are members of the social group and interact in a closed box social group environment with restricted membership and messages stored as confidential messages; and
   wherein the server, using the blogging module, manages a blog for business interactions with restricted membership and messages stored as confidential messages.

* * * * *